United States Patent
Fortschbeck

(10) Patent No.: US 11,719,280 B2
(45) Date of Patent: Aug. 8, 2023

(54) CAGE-FREE ROLLING BEARING

(71) Applicant: PAUL MULLER GMBH & CO. KG UNTERNEHMENSBETEILIGUNGEN, Nuremberg (DE)

(72) Inventor: Ewald Fortschbeck, Uttenreuth (DE)

(73) Assignee: PAUL MULLER GMBH & CO. KG UNTERNEHMENSBETEILIGUNGEN, Nuremberg (DE)

( * ) Notice: Subject to any disclaimer, the term of this patent is extended or adjusted under 35 U.S.C. 154(b) by 45 days.

(21) Appl. No.: 17/599,790

(22) PCT Filed: Mar. 30, 2020

(86) PCT No.: PCT/DE2020/100261
§ 371 (c)(1),
(2) Date: Sep. 29, 2021

(87) PCT Pub. No.: WO2020/200365
PCT Pub. Date: Oct. 8, 2020

(65) Prior Publication Data
US 2022/0106983 A1    Apr. 7, 2022

(30) Foreign Application Priority Data
Apr. 3, 2019  (DE) .................. 20 2019 101 921.2

(51) Int. Cl.
*F16C 19/16*    (2006.01)
*F16C 33/58*    (2006.01)
*F16C 33/60*    (2006.01)

(52) U.S. Cl.
CPC .......... *F16C 33/605* (2013.01); *F16C 19/163* (2013.01); *F16C 33/585* (2013.01)

(58) Field of Classification Search
CPC ........ F16C 19/163; F16C 25/06; F16C 27/04; F16C 33/585; F16C 33/605
See application file for complete search history.

(56) References Cited

U.S. PATENT DOCUMENTS 3,910,657 A * 10/1975 Dosne ................. F16C 19/26
                                                            384/569
4,387,938 A    6/1983 Brandenstein
2005/0069239 A1 3/2005 Yamamota et al.

FOREIGN PATENT DOCUMENTS

DE    102007033905 A1 *  1/2009 ........... F16C 19/163
FR          2339096 A1 *  8/1977

* cited by examiner

Primary Examiner — Phillip A Johnson
(74) Attorney, Agent, or Firm — Hayes Soloway PC

(57) ABSTRACT

The invention relates to a cage-free rolling bearing (1) having a plurality of rolling elements (4) which are arranged so as to be distributed in the circumferential direction between an inner ring (2) and an outer ring (3) that is arranged concentrically to the inner ring (2); and a pressing element (6) which is arranged in the manner of a ring segment along the circumferential direction, at least temporarily contacts at least two of the rolling elements (4) simultaneously, and applies a force oriented in an axial direction to each of the contacted rolling elements (4).

18 Claims, 4 Drawing Sheets

CAGE-FREE ROLLING BEARING

CROSS-REFERENCE TO RELATED APPLICATIONS AND PRIORITY

This patent application claims priority from PCT Patent Application No. PCT/DE2020/100261 filed Mar. 30, 2020, which claims priority from German Patent Application No. 20 2019 101 921.2 filed Apr. 3, 2019. Each of these patent applications are herein incorporated by reference in their entirety.

The invention relates to a cage-free rolling bearing.

Typically, rolling bearings which are used for applications in which relatively high speeds (speed factor $n \times dm > 10000$ mm/min) are to be expected are provided with a bearing cage, which accommodates the rolling bodies (balls, rollers) of the rolling bearing. Such a bearing cage makes it possible to achieve cost-effective service lives and smooth running. Furthermore, the bearing cage ensures that the rolling bodies are spaced apart uniformly from one another, and it prevents the tribologically disadvantageous contact between the rolling bodies during operation of the rolling bearing.

Rolling bearings without a bearing cage are also known. These rolling bearings are also referred to as cage-free rolling bearings. One advantage of these cage-free rolling bearings is, for example, that dispensing with the bearing cage means that, while dimensions of the rolling bearing remain the same, it is possible for more rolling bodies to be present and this, in turn, increases the load-bearing capacity of the rolling bearing. Such rolling bearings are also referred to as full-complement ball bearings. However, the aforementioned advantages of a rolling bearing with a bearing cage are not achieved in the case of the known cage-free rolling bearings. Dispensing with the bearing cage results in problems in particular where high speeds are concerned. For example, it is possible for the distance between the individual rolling bodies to change, or even for the rolling bodies to come into contact with one another. Such unexpected contact, in turn, increases the wear and reduces the service life of the rolling bearing.

The invention is based on the object of providing a cage-free rolling bearing which, as far as possible, prevents contact between adjacent rolling bodies during operation of the rolling bearing.

This object is achieved by the features of patent claim 1. Advantageous embodiments are described in the dependent claims.

The cage-free rolling bearing according to the invention has a plurality of rolling bodies, which are arranged in a circumferentially distributed manner between an inner ring and an outer ring, which is arranged concentrically in relation to the inner ring, and it also has a pressure-exerting element. The pressure-exerting element is arranged in the manner of a ring segment along the circumferential direction, at certain points in time establishes contact with at least two of the rolling bodies simultaneously, and subjects each of the rolling bodies with which contact is established to a force which is oriented in the axial direction.

The term "axial direction" refers to the axial direction of the concentrically arranged inner and outer rings of the rolling bearing. Furthermore, the wording "to a force which is oriented in the axial direction" should be understood to mean that the orientation to which the rolling body is subjected by the pressure-exerting element has a directional component in the axial direction; therefore, this definition covers not just the precise axial force, but also forces which, alongside an axial directional component, also have for example a radial directional component.

During operation of the rolling bearing, the pressure-exerting element has a compensating effect on the distance between adjacent rolling bodies. If, for example, the distance between the leading rolling body and the following rolling body is smaller than the theoretical distance which should arise on account of an equidistant distribution of the rolling bodies, then the amount of braking action applied to the leading rolling body by the pressure-exerting element is smaller. The distance between these rolling bodies increases correspondingly. If, in contrast, the distance between the leading rolling body and the following rolling body is greater than the theoretical distance, then the amount of braking action applied to the leading rolling body by the pressure-exerting element is greater. The distance between these rolling bodies decreases correspondingly.

The distance between the individual rolling bodies is therefore adjusted to the theoretical distance. Contact between adjacent rolling bodies during operation of the rolling bearing is thus, as far as possible, prevented. The service life of the rolling bearing increases correspondingly and the cage-free rolling bearing is, in particular, also suitable for applications involving high speeds.

In an advantageous embodiment, the pressure-exerting element here is stationary. It is generally the case with rolling bearings that either the inner ring or the outer ring is stationary, whereas the respective other ring rotates at the speeds required on the basis of the application. During operation, the rolling bodies roll on the respective running surfaces of the inner ring and of the outer ring. It is also possible for further elements of the rolling bearing, e.g. cover plates, which are usually likewise stationary, to be present. Stationary, then, means that the pressure-exerting element is connected in a fixed state to one of the stationary elements (e.g. the stationary ring, the cover plate or an adjacent component) of the rolling bearing. This results in the rolling bodies moving relative to the pressure-exerting element. During the rotary movement of the rolling bearing, it is therefore the case that all the rolling bodies in turn come into contact one after the other with the pressure-exerting element. One advantage of the pressure-exerting element being designed in the form of a stationary pressure-exerting element is that, from a technical point of view, this is relatively straightforward to achieve.

However, it is also possible for the pressure-exerting element to be designed in the form of a rotating pressure-exerting element. In this case, the pressure-exerting element is fitted on a rotating element of the rolling bearing, e.g. on the rotating ring. Since the set of rolling bodies typically circulates at approximately the average speed of the outer and inner rings, more or less the same relative movement between a set of rolling bodies and the pressure-exerting element would be achieved and the operating principle of the pressure-exerting element would be more of less identical.

In other words, the pressure-exerting element performs the function of regulating the spacing of the rolling bodies as they circulate, this being done by the pressure-exerting element influencing the speed of circulation of the rolling bodies locally by applying specific forces. This is achieved in that the elastic configuration and elastic positioning of the pressure-exerting element are such that different distributions of forces on a leading rolling body and a trailing rolling body are set depending on whether the trailing rolling body is spaced apart to a greater or lesser extent from the leading rolling body.

For example, the contact force between the pressure-exerting element and rolling body gives rise to the speed of circulation of the rolling body being braked by the force being directed axially against a supporting shoulder of an inner ring or against the supporting outer-ring shoulder of the rolling bearing. Consequently, a separating effect can be achieved by an increase in the contact force applied to a trailing rolling body which has become critically close.

The following advantages of the cage-free rolling bearing according to the invention are achieved:
- a higher load-bearing capacity can be achieved by a greater number of rolling bodies in bearings without installation-induced restriction of the packing density, in particular in which at least one rim is offset at least to some extent (e.g. angular-contact ball bearings, spindle bearings, filling-slot bearings), in that the amount of space required for the intermediate cross-pieces in the cage which are used for separating the rolling bodies is dispensed with.
- It is possible to achieve a reduced level of friction in that the friction points between the cage pockets and rolling bodies, and on the guide surfaces of the rotating cage, and the hysteresis losses in the material of the cage which are induced by constraining forces, are done away with.
- As far as the running properties of the bearing are concerned, the non-repeatable runout induced by a co-rotating cage which, in turn for its eccentric, rotary and elastic freedom runs in an undefined manner, is done away with.
- It is possible to achieve more advantageous kinematic ratios during the rolling action of the rolling body, in terms of spin/roll ratio and ball advancement/retardation, by way of a compensating or reducing effect on the angle of contact of the rolling body with the outer ring and the inner ring of the bearing.

In an advantageous embodiment, the pressure-exerting element has a pressure-exerting tongue, which is provided with mounting in a first end region. The pressure-exerting tongue here is advantageously mounted via an extension which functions as a bearing block and via which the pressure-exerting element is connected in a rotationally fixed manner to one of the stationary elements of the rolling bearing or the surroundings thereof.

A second end region of the pressure-exerting tongue, said second end region being located opposite the first end region of the pressure-exerting tongue, is preferably designed in the form of a self-supporting end. The design in the form of a self-supporting tongue (in a manner similar to a bending beam) provides the pressure-exerting element with an elasticity by way of which the rolling bodies with which contact is established in each case are subjected to a variable axial force. This allows the distance between adjacent rolling bodies to be adjusted in a particularly precise manner.

However, for stability-related reasons, it is also possible for the second end region of the pressure-exerting tongue to be fixed in a resilient manner.

The cross section of the pressure-exerting tongue advantageously tapers, i.e. the cross section of the pressure-exerting tongue advantageously decreases, from the first end region in the direction of the second end region. Accordingly, the second end region has a smaller cross section than the first end region. This makes it possible to adjust the distribution of elasticity or the bending moment of resistance of the pressure-exerting element. This also, in turn, results in particularly precise adjustment of the distance between two adjacent rolling bodies. The cross-section can be tapered here by the thickness and/or the width of the pressure-exerting tongue being reduced.

Furthermore, a beveled run-on region can be formed in the first end region of the pressure-exerting tongue. This beveled run-on region gives rise to a smooth introduction of the axial force at the beginning of the contact between the respective rolling body and the pressure-exerting element.

It is also possible for a bevelled run-off region to be formed in the second end region. This beveled run-off region gives rise to a smooth cancellation of the introduction of force at the end of the contact between the respective rolling body and the pressure-exerting element.

In a further advantageous embodiment, the pressure-exerting tongue is of curved design. Such curvature likewise influences the elastic prestressing (or elastic positioning) of the pressure-exerting element and therefore results in particularly precise adjustment of the distance between two adjacent rolling bodies.

In a further advantageous embodiment, the pressure-exerting element is designed in the form of a rocker-like pressure-exerting element which is provided with mounting in a central region and is either fixed in a resilient manner or fully self-supporting at the two end regions. This means that the pressure-exerting element can function as a kind of elastic rocker, and a leading rolling body could be accelerated to a more pronounced extent when a following rolling body comes critically close.

According to the invention, it is necessary at certain points in time for the pressure-exerting element to subject at least two rolling bodies simultaneously to a force in the axial direction. However, it is also possible for the pressure-exerting element to subject more than two rolling bodies simultaneously to a force in the axial direction. This makes it possible to adjust the distance over a plurality of rolling bodies and over a relatively long period of time. This reduces the possibility of undesired contact between adjacent rolling bodies in addition.

It is also possible for a plurality of pressure-exerting elements to be distributed over the circumference. This also reduces the possibility of undesired contact between adjacent rolling bodies in addition.

The rolling bearing is advantageously designed in the form of an angular-contact ball bearing. If the rolling bodies are pushed in the direction of the outer-ring shoulder of the angular-contact ball bearing by the pressure-exerting element, then this makes possible a particularly defined introduction of force by the pressure-exerting element.

The invention will be explained further with reference to exemplary embodiments in the figures, in which.

Figure 1:
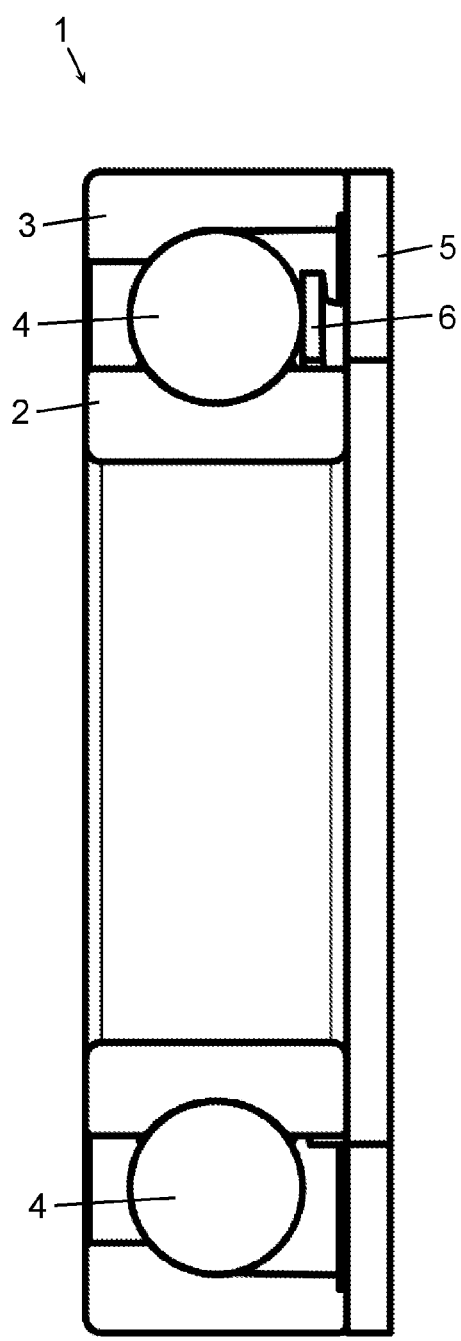
FIG. 1 shows a sectional illustration of a cage-free rolling bearing.

FIG. 1 shows a sectional illustration of a cage-free rolling bearing 1. The rolling bearing has an inner ring 2 and an outer ring 3, which is arranged concentrically in relation to the inner ring 2. An annular interior space is formed between the inner ring 2 and the outer ring 2. Rolling bodies 4 are distributed in an equidistant manner in the circumferential direction in this inner space. An annular cover plate 5 forms the axial termination on the right-hand side of the rolling bearing 1, as seen in FIG. 1. Sealing elements (not illustrated in the figures) can be provided between this cover plate 5 and the inner ring 2 and/or the outer ring 3.

Figure 2:
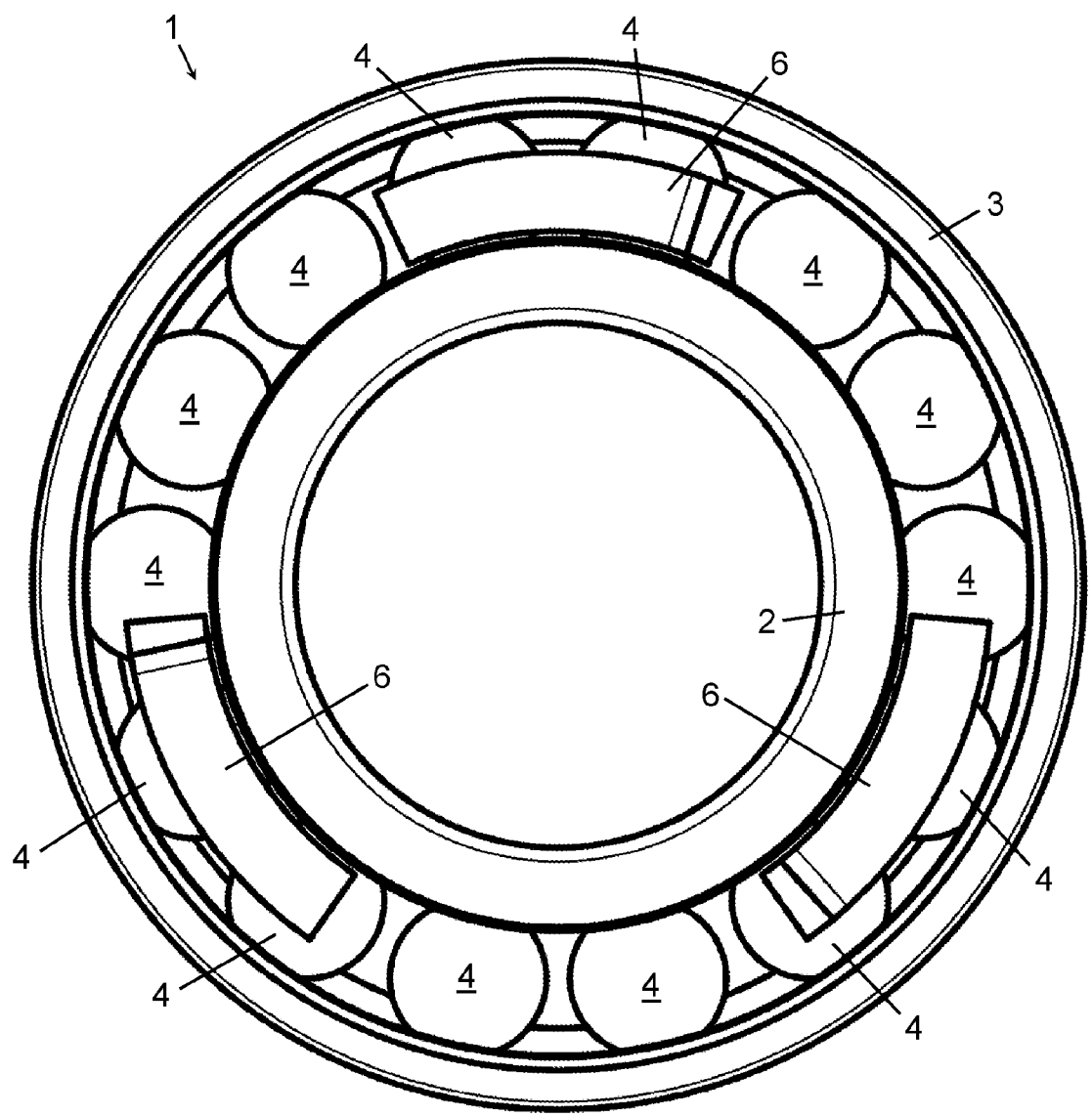
FIG. 2 shows a front view of the rolling bearing from FIG. 1, which dispenses with the illustration of the cover plate.

FIG. 2 shows a front view of the rolling bearing 1 from FIG. 1, wherein, for reasons of clarity, the cover plate 5 has not been illustrated. In addition to the inner ring 2, the outer ring 3, the rolling bodies 4 and the cover plate 5, the rolling bearing 1 has a total of three pressure-exerting elements 6.

The pressure-exerting elements 6 are fastened on the cover plate 5 and distributed in an equidistant manner in the circumferential direction. Each pressure-exerting element 6 has a basic shape in the manner of a ring segment and, accordingly, covers a ring segment of the inner space. Each pressure-exerting element 6 here covers over an angular region of such a magnitude that at certain points in time the pressure-exerting element 6 establishes contact with at least two rolling bodies 4 simultaneously. Each pressure-exerting element 6 here subjects the rolling bodies 4 with which contact is established to a force which is oriented in the axial direction. More specifically, the pressure-exerting elements 6 subject the rolling bodies 4 to an axial force which is directed from right to left, as seen in FIG. 1. The rolling bodies 4 are therefore pushed in the direction of the shoulder of the outer ring 3 by the pressure-exerting elements 6.

Figure 3:
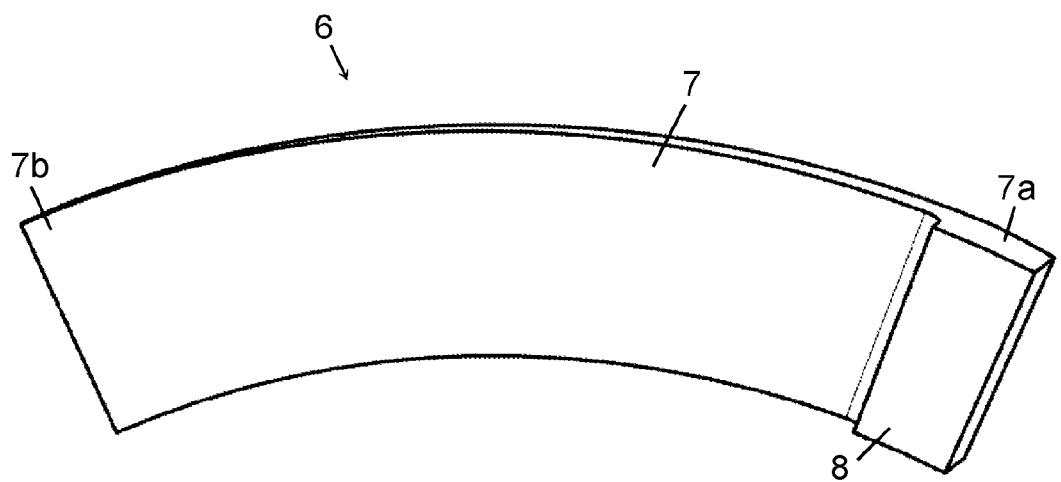
FIG. 3 shows one of the pressure-exerting elements from FIG. 2 on its own.
Figure 4:
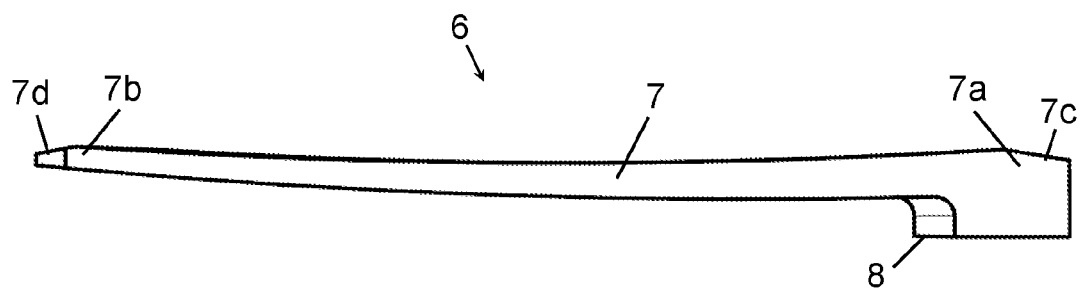
FIG. 4 shows a side view of the pressure-exerting element from FIG. 3.

FIG. 3 and FIG. 4 show the pressure-exerting element 6 from FIG. 1 and FIG. 2 on its own. FIG. 4 shows the pressure-exerting element 6 from the same perspective as FIG. 2. FIG. 3 illustrates a side view of the pressure-exerting element 6.

The pressure-exerting element 6 has a pressure-exerting tongue 7 and an extension 8. The extension 8 is formed at a first end region 7a of the pressure-exerting tongue 7 and serves to fasten the pressure-exerting element 6 on the cover plate 5. The pressure-exerting element 6 is therefore provided with mounting in the first end region 7a. The second end region 7b of the pressure-exerting tongue 7, said second end region being located opposite the first end region 7a, is designed in the form of a self-supporting end. That is to say, the second end region 7b is not provided with mountings. The cross section of the pressure-exerting tongue 7 tapers from the first end region 7a in the direction of the second end region 7b. More specifically, the thickness of the pressure-exerting tongue 7 decreases, whereas the width of the pressure-exerting tongue 7 remains constant. A beveled run-on region 7c is formed in the first end region 7a. A beveled run-off region 7d is formed in the second end region 7b. As illustrated, in particular, in FIG. 4, the pressure-exerting tongue 7 is of curved design.

Figure 5:
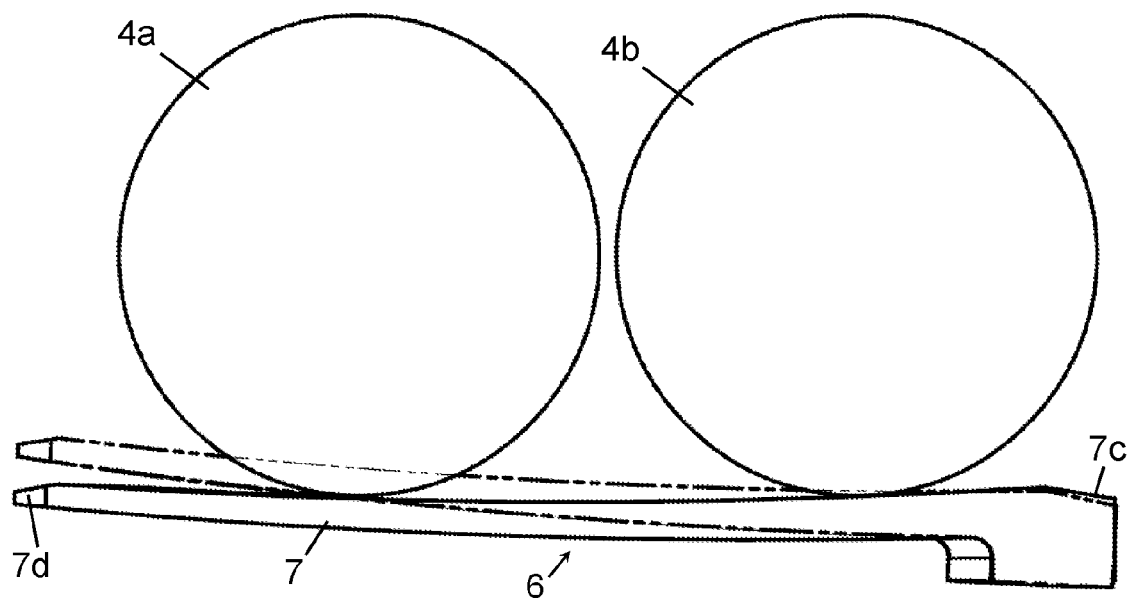
FIG. 5 shows a schematic diagram of the pressure-exerting element with two rolling bodies in contact with the pressure-exerting element.

FIG. 5 shows, schematically, the functional principle of the cage-free rolling bearing 1. A pressure-exerting element 6 and, by way of example, two rolling bodies 4a, 4b are illustrated. The pressure-exerting 6 would assume the dashed-line position if the rolling bodies 4a and 4b were not present. The two rolling bodies 4a, 4b push the pressure-exerting element 6 into the position which is shown by solid lines. At the same time, the pressure-exerting element 6 subjects the two rolling bodies 4a and 4b to a corresponding opposing force. This opposing force corresponds to the axially directed force to which the rolling bodies 4 are subjected by the pressure-exerting element 6.

During operation (i.e. during rotation) of the rolling bearing 1, the rolling body 4a constitutes a leading rolling body and the rolling body 4b constitutes a trailing rolling body. First of all, therefore, the rolling body 4a came into contact with the pressure-exerting element 6 in the region of the run-on region 7c and then continues moving from the first end region 7a in the direction of the second end region 7b. At an appropriately later point in time, the trailing rolling body 4b came into contact with the pressure-exerting element 6 in the region of the run-on region 7c and likewise continues moving from the first end region 7a in the direction of the second end region 7b. First of all, the leading rolling body 4a will have reached the second end region 7b and then will lose contact with the pressure-exerting element 6 via the run-off region 7d. At the same time, the rolling body 4 which follows the rolling body 4b will already have passed the run-on region 7c. Accordingly, the rolling body 4b then becomes the leading rolling body in relation to this new, trailing rolling body, etc.

If, then, for example the distance between the leading rolling body 4a and the following rolling body 4b is smaller than the theoretical distance which should arise on account of an equidistant distribution of the rolling bodies 4, then the amount of braking action applied to the leading rolling body by the pressure-exerting element 6 is smaller. The distance between the rolling bodies 4a and 4b would increase correspondingly. If, in contrast, the distance between the leading rolling body 4a and the following rolling body 4b is greater than the theoretical distance, then the amount of braking action applied to the leading rolling body 4a by the pressure-exerting element 6 is greater. The distance between the rolling bodies 4a and 4b would decrease correspondingly.

The distance between the rolling bodies 4a and 4b is therefore adjusted to the theoretical distance. Contact between adjacent rolling bodies 4a and 4b during operation of the rolling bearing 1 is thus reliably prevented.

Figure 6:
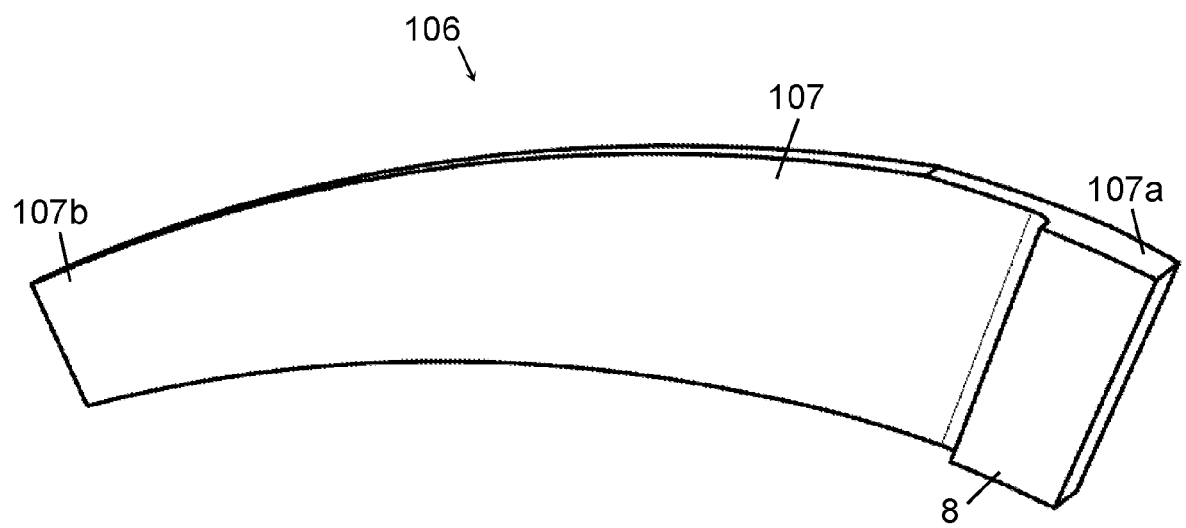
FIG. 6 shows a further embodiment of the pressure-exerting element.

FIG. 6 shows a further embodiment of the pressure-exerting element. The pressure-exerting 106, which is illustrated in FIG. 6, differs from the pressure-exerting element 6, which is illustrated in the preceding figures, by way of a differently shaped pressure-exerting tongue 107. Whereas the pressure-exerting tongue 7 of the pressure-exerting element 6 has a constant width, the pressure-exerting element 107 has a tapering width. More specifically, the width of the pressure-exerting element 107 decreases from the first end region 107a in the direction of the second end region 107b. Accordingly, the second end region 107b has a smaller cross section than the first end region 107a. This means that the pressure-exerting element 106 has a different distribution of elasticity or a different bending moment of resistance than the pressure-exerting element 6.

In the embodiment which is illustrated in the figures, the rolling bodies 4 are designed in the form of balls. Accordingly, the rolling bearing 1 is designed in the form of a ball bearing, more specifically in the form of an angular-contact ball bearing. However, it is also possible for the rolling bodies 4 to be cylindrical, that is to say designed in the form of rollers or cylinders.

In the embodiment which is illustrated in the figures, three pressure-exerting elements 6 are distributed in an equidistant manner. However, it is also possible to provide a different number of pressure-exerting elements or to provide just a single pressure-exerting element 6.

In the embodiment which is illustrated in the figures, the rolling bearing 1 is designed in the form of a full-complement rolling bearing. A high load-bearing capacity is achieved by virtue of the inner space being filled more or less completely by the rolling bodies 4. However, it is also possible for the rolling bodies 4 to be packed less densely.

In the embodiment which is illustrated in the figures, the pressure-exerting elements 6 are connected to the cover plate 5. However, it is also possible for the pressure-exerting elements 6 to be connected to some other stationary component of the rolling bearing or to a retaining part arranged adjacent to the rolling bearing. Furthermore, it is also possible for the pressure-exerting element 6 to be arranged on a rotating element of the rolling bearing 1, e.g. on the rotating inner ring 2 or outer ring 3.

In the embodiments that are illustrated in the figures, the pressure-exerting elements 6, 106 are designed in the form of pressure-exerting elements each with a pressure-exerting tongue 7 or 107, respectively. The respectively second end region 7b or 107b here is of fully self-supporting design. However, it is also possible for the second end region 7b or 107b to be fixed in a resilient manner.

In addition, it is also possible to provide one or more pressure-exerting elements designed in the form of a rocker-like pressure-exerting element which is provided with mounting in a central region and is either fixed in a resilient manner or self-supporting at the two end regions. Such a configuration of the pressure-exerting element is advantageous, in particular, for axially reciprocal orientation of the pressure-exerting force.

LIST OF REFERENCE SIGNS

1 Cage-free rolling bearing
2 Inner ring
3 Outer ring
4,4a,4b Rolling body
Cover plate
6,106 Pressure-exerting element
7,107 Pressure-exerting tongue
7a,107a First end region
7b,107b Second end region
7c Run-on region
7d Run-off region
8 Extension

The invention claimed is:

1. A cage-free rolling bearing having:
a plurality of rolling bodies, which are arranged in a circumferentially distributed manner between an inner ring and an outer ring arranged concentrically in relation to the inner ring; and
a pressure-exerting element, which
is arranged in the manner of a ring segment along the circumferential direction,
at least at certain points in time establishes contact with at least two of the rolling bodies simultaneously, and
subjects each of the rolling bodies with which contact is established to a force which is oriented in the axial direction,
wherein the rolling bearing is closed off in the axial direction by an annular cover plate and the pressure-exerting element is fitted on the cover plate.

2. The cage-free rolling bearing as claimed in claim 1, wherein the pressure-exerting element is designed in the form of a rocker-like pressure-exerting element which is provided with a mounting in a central region and is either fixed in a resilient manner or self-supporting at a first end region and a second end region.

3. The cage-free rolling bearing as claimed in claim 1, wherein the pressure-exerting element establishes contact simultaneously with at most two of the rolling bodies.

4. The cage-free rolling bearing as claimed in claim 1, wherein the pressure-exerting element establishes contact simultaneously with at most three of the rolling bodies.

5. The cage-free rolling bearing as claimed in claim 1, wherein a plurality of pressure-exerting elements are distributed in an equidistant manner over the circumference.

6. The cage-free rolling bearing as claimed in claim 1, wherein the rolling bearing is an angular-contact ball bearing.

7. The cage-free rolling bearing as claimed in claim 1, wherein the pressure-exerting element has a pressure-exerting tongue, which is provided with a mounting in a first end region and a second end region, wherein the second end region is designed in the form of a self-supporting end.

8. The cage-free rolling bearing as claimed in claim 7, wherein the second end region of the pressure-exerting tongue is fixed in a resilient manner.

9. The cage-free rolling bearing as claimed in claim 7, wherein the cross section of the pressure-exerting tongue tapers from the first end region to the second end region.

10. The cage-free rolling bearing as claimed in claim 7, wherein a beveled run-on region is formed in the first end region.

11. The cage-free rolling bearing as claimed in claim 7, wherein a beveled run-off region is formed in the second end region.

12. The cage-free rolling bearing as claimed in claim 7, wherein the pressure-exerting tongue is curved.

13. A cage-free rolling bearing having:
a plurality of rolling bodies, which are arranged in a circumferentially distributed manner between an inner ring and an outer ring arranged concentrically in relation to the inner ring; and
a pressure-exerting element, which
is arranged in the manner of a ring segment along the circumferential direction,
at least at certain points in time establishes contact with at least two of the rolling bodies simultaneously, and
subjects each of the rolling bodies with which contact is established to a force which is oriented in the axial direction,
wherein the pressure-exerting element has a pressure-exerting tongue, which is provided with a mounting in a first end region and a second end region, wherein the second end region is designed in the form of a self-supporting end.

14. The cage-free rolling bearing as claimed in claim 13, wherein the second end region of the pressure-exerting tongue is fixed in a resilient manner.

15. The cage-free rolling bearing as claimed in claim 13, wherein the cross section of the pressure-exerting tongue tapers from the first end region to the second end region.

16. The cage-free rolling bearing as claimed in claim 13, wherein a beveled run-on region is formed in the first end region.

17. The cage-free rolling bearing as claimed in claim 13, wherein a beveled run-off region is formed in the second end region.

18. The cage-free rolling bearing as claimed in claim 13, wherein the pressure-exerting tongue is curved.

* * * * *